(12) United States Patent
Liu et al.

(10) Patent No.: US 12,379,819 B2
(45) Date of Patent: Aug. 5, 2025

(54) METHOD AND APPARATUS FOR ADJUSTING PERSPECTIVE OF DIRECTION INDICATOR, ELECTRONIC DEVICE, AND STORAGE MEDIUM

(71) Applicant: Beijing Baidu Netcom Science Technology Co., Ltd., Beijing (CN)

(72) Inventors: Yanan Liu, Beijing (CN); Da Qu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 288 days.

(21) Appl. No.: 17/867,588

(22) Filed: Jul. 18, 2022

(65) Prior Publication Data

US 2023/0259245 A1 Aug. 17, 2023

(30) Foreign Application Priority Data

Feb. 15, 2022 (CN) .......................... 202210139313.X

(51) Int. Cl.
*G06F 3/0481* (2022.01)
*G06F 3/04845* (2022.01)
(Continued)

(52) U.S. Cl.
CPC ........ *G06F 3/0481* (2013.01); *G06F 3/04845* (2013.01); *H04N 23/631* (2023.01); *H04N 23/698* (2023.01)

(58) Field of Classification Search
CPC ............... G06F 3/0481; G06F 3/04845; G06F 3/04815; G06F 9/451; H04N 23/631; H04N 23/698; H04N 23/633
See application file for complete search history.

(56) References Cited

U.S. PATENT DOCUMENTS 9,824,723 B1  11/2017  Bentley et al.

FOREIGN PATENT DOCUMENTS

| CN | 111773657 A | 10/2020 |
|---|---|---|
| CN | 113117332 A | 7/2021 |
| CN | 113318441 A | 8/2021 |

OTHER PUBLICATIONS

Tan, Zhao-yi, "Vehicle Blind Spot Reproduction System in First-person View", Software Guide, Sep. 15, 2020.
(Continued)

*Primary Examiner* — Matthew Ell
*Assistant Examiner* — Alvaro R Calderon, IV
(74) *Attorney, Agent, or Firm* — Knobbe, Martens, Olson & Bear, LLP

(57) ABSTRACT

The prevent disclosure provides a method and apparatus for adjusting a perspective of a direction indicator, an electronic device, and a storage medium, which includes that: a first area and a second area corresponding to a first direction indicator are acquired, where the first direction indicator is configured to indicate a forward direction in a panorama display scene, the first area is a visible area of the first direction indicator in a graphical user interface, and the second area is an invisible area of the first direction indicator outside the graphical user interface; an initial perspective range corresponding to the second area is acquired; a target perspective range to which a first perspective belongs is determined from the initial perspective range, and a second direction indicator corresponding to the target perspective range is displayed; and the first perspective is adjusted to a second perspective based on the second direction indicator.

19 Claims, 7 Drawing Sheets

(51) Int. Cl.
*H04N 23/63* (2023.01)
*H04N 23/698* (2023.01)

(56) References Cited

OTHER PUBLICATIONS

The First Search Report of the counterpart CN application No. 202210139313.X issued on May 22, 2023.

```
┌─────────────────────────────────────────────────────────────────────┐
│   A first area and a second area corresponding to the first         │
│   direction indicator are acquired. The first direction indicator   │
│   is configured to indicate a forward direction in the panorama     │
│   display scene. The first area is a visible area of the first      │──S20
│   direction indicator in the graphical user interface, and the      │
│   second area is an invisible area of the first direction           │
│   indicator outside the graphical user interface                    │
└─────────────────────────────────────────────────────────────────────┘
                                   │
                                   ▼
┌─────────────────────────────────────────────────────────────────────┐
│   An initial perspective range corresponding to the second area     │──S22
│   is acquired                                                       │
└─────────────────────────────────────────────────────────────────────┘
                                   │
                                   ▼
┌─────────────────────────────────────────────────────────────────────┐
│   A target perspective range to which a first perspective belongs   │
│   is determined froM the initial perspective range, and a second    │
│   direction indicator corresponding to the target perspective       │──S24
│   range is displayed. The first perspective is a current            │
│   horizontal perspective monitored during rotation of a panorama    │
└─────────────────────────────────────────────────────────────────────┘
                                   │
                                   ▼
┌─────────────────────────────────────────────────────────────────────┐
│   The first perspective is adjusted to a second perspective based   │
│   on the second direction indicator. The second perspective is an   │──S26
│   initial horizontal perspective of the first direction indicator   │
│   displayed in the graphical user interface                         │
└─────────────────────────────────────────────────────────────────────┘
```

Fig. 2

METHOD AND APPARATUS FOR ADJUSTING PERSPECTIVE OF DIRECTION INDICATOR, ELECTRONIC DEVICE, AND STORAGE MEDIUM

CROSS-REFERENCE TO RELATED APPLICATIONS

The present disclosure claims priority of Chinese Patent Application No. 202210139313.X, filed to China Patent Office on Feb. 15, 2022. Contents of the present disclosure are hereby incorporated by reference in entirety of the Chinese Patent Application.

TECHNICAL FIELD

The prevent disclosure relates to the technical field of computers, and in particular to a method and apparatus for adjusting a perspective of a direction indicator, an electronic device, and a storage medium.

BACKGROUND

In a panorama display scene, in order to display spatial information to a user more intuitively, a panoramic topological structure is generally designed. The panoramic topological structure may include multiple panoramas and multiple topology arrows. The multiple topology arrows may represent position relationships of the multiple panoramas in a real or virtual scene. The user may switch the currently displayed panorama according to the topology arrows. In a panorama, the perspective of the user may be rotated 360 degrees. In response to a topology arrow being rotated to a invisible area of the current perspective, the user needs to find the topology arrow again for panorama switching.

In the related art, when the topology arrow of the panorama display scene is rotated to the invisible area, since a current position and a direction of the topology arrows cannot be determined, the user needs to blindly rotate the perspective to manually search the topology arrow. However, the disadvantages of the method lie in that, the automatic homing of the topology arrow cannot be efficiently achieved, resulting in poor user experience.

In view of the above problems, no effective solution has been provided yet.

SUMMARY

At least some embodiments of the prevent disclosure provide a method and apparatus for adjusting a perspective of a direction indicator, an electronic device, and a storage medium, so at least to partially solve the technical problem of low efficiency and poor user experience in a processing method of blindly rotating the perspective to manually search for topology arrows in the related art.

In an embodiment of the prevent disclosure, a method for adjusting a perspective of a direction indicator is provided. A graphical user interface is provided by an electronic device. Contents displayed in the graphical user interface at least partially include a panorama scene screen obtained by photographing a panorama display scene by means of an image acquisition component and a first direction indicator. The method includes: acquiring a first area and a second area corresponding to the first direction indicator, where the first direction indicator is configured to indicate a forward direction in the panorama display scene, the first area is a visible area of the first direction indicator in the graphical user interface, and the second area is an invisible area of the first direction indicator outside the graphical user interface; acquiring an initial perspective range corresponding to the second area; determining a target perspective range to which a first perspective belongs from the initial perspective range, and displaying a second direction indicator corresponding to the target perspective range, where the first perspective is a current horizontal perspective monitored during rotation of a panorama; and adjusting the first perspective to a second perspective based on the second direction indicator. The second perspective is an initial horizontal perspective of the first direction indicator displayed in the graphical user interface.

In another embodiment of the prevent disclosure, an apparatus for adjusting a perspective of a direction indicator is further provided. A graphical user interface is provided by an electronic device. Contents displayed in the graphical user interface at least partially include a panorama scene screen obtained by photographing a panorama display scene by means of an image acquisition component and a first direction indicator. The apparatus includes: a first acquisition module, configured to acquire a first area and a second area corresponding to the first direction indicator, where the first direction indicator is configured to indicate a forward direction in the panorama display scene, the first area is a visible area of the first direction indicator in the graphical user interface, and the second area is an invisible area of the first direction indicator outside the graphical user interface; a second acquisition module, configured to acquire an initial perspective range corresponding to the second area; a determination module, configured to determine a target perspective range to which a first perspective belongs from the initial perspective range, and display a second direction indicator corresponding to the target perspective range, where the first perspective is a current horizontal perspective monitored during rotation of a panorama; and an adjustment module, configured to adjust the first perspective to a second perspective based on the second direction indicator. The second perspective is an initial horizontal perspective of the first direction indicator displayed in the graphical user interface.

In another embodiment of the prevent disclosure, an electronic device is further provided. The electronic device includes at least one processor and a memory communicatively connected with the at least one processor. The memory is configured to store at least one instruction executable by the at least one processor. The at least one instruction is performed by the at least one processor, to cause the at least one processor to perform the method for adjusting the perspective of the direction indicator mentioned above.

In another embodiment of the prevent disclosure, a non-transitory computer-readable storage medium storing at least one computer instruction is further provided. The at least one computer instruction is used for a computer to perform the method for adjusting the perspective of the direction indicator mentioned above.

In another embodiment of the prevent disclosure, a computer program product is further provided. The computer program product includes a computer program. The method for adjusting the perspective of the direction indicator mentioned above is implemented when the computer program is performed by a processor.

In the embodiments of the prevent disclosure, the first area and the second area corresponding to the first direction indicator are acquired. The first direction indicator is configured to indicate the forward direction in the panorama display scene. The first area is the visible area of the first direction indicator in the graphical user interface. The second area is the invisible area of the first direction indicator outside the graphical user interface. The initial perspective range corresponding to the second area is acquired. The target perspective range to which the first perspective belongs is determined from the initial perspective range, and the second direction indicator corresponding to the target perspective range is displayed. The first perspective is the current horizontal perspective monitored during rotation of the panorama. The first perspective is adjusted to the second perspective based on the second direction indicator. The second perspective is the initial horizontal perspective of the first direction indicator displayed in the graphical user interface. Therefore, a purpose of automatically homing the topology arrows according to a panorama direction indicator can be achieved, and the technical effect of improving user experience by enhancing homing efficiency of the panorama topology arrows can be realized, thereby solving the technical problem of low efficiency and poor user experience in a processing method of blindly rotating the perspective to manually search for topology arrows in the related art.

It should be understood that, the content described in this section is not intended to identify the key or important features of the embodiments of the prevent disclosure, nor is it intended to limit the scope of the prevent disclosure. Other features of the prevent disclosure will become easy to understand through the following description.

BRIEF DESCRIPTION OF THE DRAWINGS

Drawings are used for better understanding the solution, and are not intended to limit the prevent disclosure.

FIG. 2 is a flowchart of a method for adjusting a perspective of a direction indicator according to an embodiment of the prevent disclosure.

DETAILED DESCRIPTION

Exemplary embodiments of the prevent disclosure are described in detail below with reference to the drawings, including various details of the embodiments of the prevent disclosure to facilitate understanding, and should be regarded as exemplary. Thus, those of ordinary skilled in the art shall understand that, variations and modifications can be made on the embodiments described herein, without departing from the scope and spirit of the prevent disclosure. Likewise, for clarity and conciseness, descriptions of well-known functions and structures are omitted in the following description.

It is to be noted that terms "first", "second" and the like in the description, claims and the above mentioned drawings of the prevent disclosure are used for distinguishing similar objects rather than describing a specific sequence or a precedence order. It should be understood that the data used in such a way may be exchanged where appropriate, in order that the embodiments of the prevent disclosure described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

An embodiment of the prevent disclosure provides a method for adjusting a perspective of a direction indicator. It is to be noted that the steps shown in the flow diagram of the accompanying drawings may be executed in a computer system, such as a set of computer-executable instructions, and although a logical sequence is shown in the flow diagram, in some cases, the steps shown or described may be executed in a different order than here.

Figure 1:
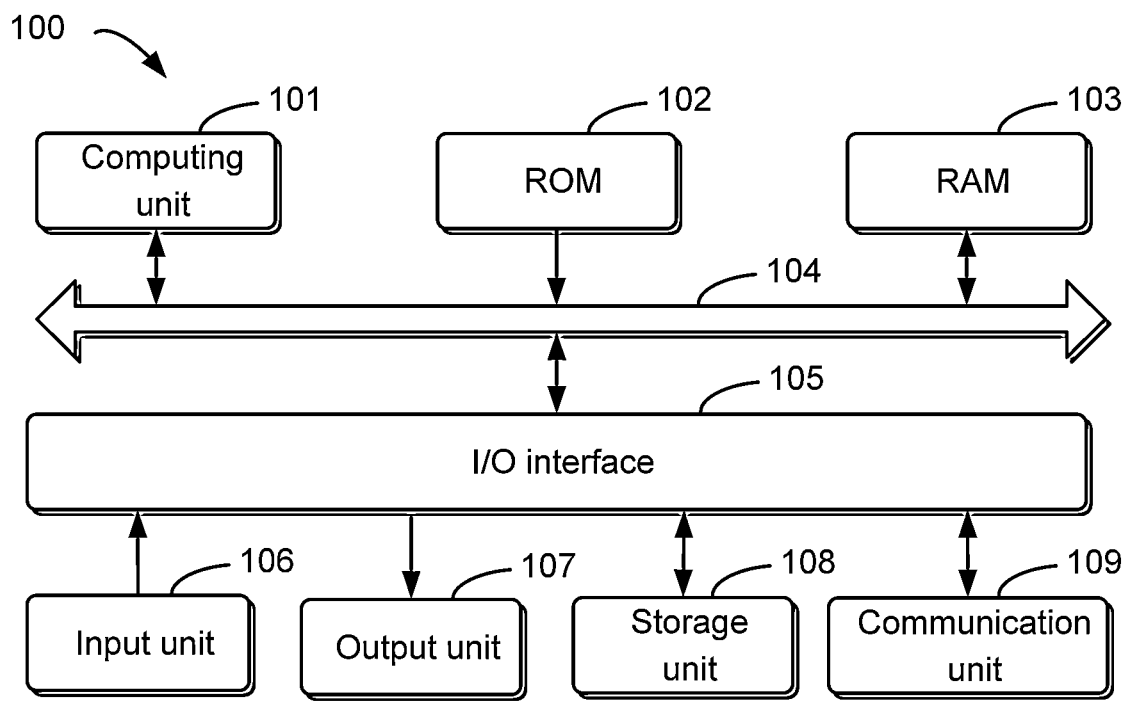
FIG. 1 is a block diagram of a hardware structure of a computer terminal (or a mobile device) configured to implement a method for adjusting a perspective of a direction indicator according to an embodiment of the prevent disclosure.

The method embodiment provided in this embodiment of the prevent disclosure may be performed in a mobile terminal, a computer terminal, or a similar electronic device. The electronic device is intended to represent various forms of digital computers, such as laptop computers, desktop computers, workbenches, personal digital assistants, servers, blade servers, mainframe computers, and other suitable computers. The electronic device may also express various forms of mobile apparatuses, such as personal digital processing, cellular phones, smart phones, wearable devices, and other similar computing apparatuses. The components shown herein, connections and relationships of the components and functions of the components are examples, and are not intended to limit the implementation of the prevent disclosure described and/or required herein. FIG. 1 is a block diagram of a hardware structure of a computer terminal (or a mobile device) configured to implement a method for adjusting a perspective of a direction indicator according to an embodiment of the prevent disclosure.

As shown in FIG. 1, the computer terminal 100 includes a computing unit 101. The computing unit may perform various appropriate actions and processing operations according to a computer program stored in a Read-Only Memory (ROM) 102 or a computer program loaded from a storage unit 108 into a Random Access Memory (RAM) 103. In the RAM 103, various programs and data required for the operation of the computer terminal 100 may also be stored. The computing unit 101, the ROM 102, and the RAM 103 are connected with each other by using a bus 104. An Input/Output (I/O) interface 105 is also connected with the bus 104.

Multiple components in the computer terminal 100 are connected with the I/O interface 105, and include: an input unit 106, such as a keyboard and a mouse; an output unit 107, such as various types of displays and loudspeakers; the storage unit 108, such as a disk and an optical disc; and a communication unit 109, such as a network card, a modem, and a wireless communication transceiver. The communication unit 109 allows the computer terminal 100 to exchange information/data with other devices through a computer network, such as the Internet, and/or various telecommunication networks.

The computing unit 101 may be various general and/or special processing assemblies with processing and computing capabilities. Some examples of computing unit 101 include, but are not limited to, a Central Processing Unit (CPU), a Graphics Processing Unit (GPU), various dedicated Artificial Intelligence (AI) computing chips, various computing units for running machine learning model algorithms, a Digital Signal Processor (DSP), and any appropriate processors, controllers, microcontrollers, etc. The computing unit 101 performs the method for adjusting a perspective of a direction indicator described here. For example, in some embodiments, the method for adjusting a perspective of a direction indicator may be implemented as a computer software program, which is tangibly included in a machine-readable medium, such as the storage unit 108. In some embodiments, part or all of the computer programs may be loaded and/or installed on the computer terminal 100 via the ROM 102 and/or the communication unit 109. When the computer program is loaded into the RAM 103 and performed by the computing unit 101, at least one step of the method for adjusting a perspective of a direction indicator may be performed. Alternatively, in other embodiments, the computing unit 101 may be configured to perform the method for adjusting a perspective of a direction indicator in any other suitable manners (for example, by means of firmware).

Various implementations of systems and technologies described here may be implemented in a digital electronic circuit system, an integrated circuit system, a Field Programmable Gate Array (FPGA), an Application-Specific Integrated Circuit (ASIC), an Application-Specific Standard Product (ASSP), a System-On-Chip (SOC), a Load Programmable Logic Device (CPLD), computer hardware, firmware, software, and/or a combination thereof. These various implementations may include: being implemented in at least one computer program, the at least one computer program may be performed and/or interpreted on a programmable system including at least one programmable processor. The programmable processor may be a dedicated or general programmable processor, which can receive data and instructions from a storage system, at least one input apparatus, and at least one output apparatus, and transmit the data and instructions to the storage system, the at least one input apparatus, and the at least one output apparatus.

It is to be noted herein that, in some optional embodiments, the electronic device shown in FIG. 1 may include a hardware element (including a circuit), a software element (including a computer code stored on the computer-readable medium), or a combination of the hardware element and the software element. It should be noted that, FIG. 1 is an example of a specific example, and is intended to illustrate the types of components that may be present in the above electronic device.

Under the above operation environment, the prevent disclosure provides the method for adjusting a perspective of a direction indicator shown in FIG. 2. The method may be performed by the computer terminal shown in FIG. 1 or a similar electronic device. FIG. 2 is a flowchart of a method for adjusting a perspective of a direction indicator according to an embodiment of the prevent disclosure. As shown in FIG. 2, a graphical user interface is provided by the electronic device. Contents displayed in the graphical user interface at least partially include a panorama scene screen obtained by photographing a panorama display scene by means of an image acquisition component and a first direction indicator. The method includes the following steps.

At step S20, a first area and a second area corresponding to the first direction indicator are acquired. The first direction indicator is configured to indicate a forward direction in the panorama display scene. The first area is a visible area of the first direction indicator in the graphical user interface, and the second area is an invisible area of the first direction indicator outside the graphical user interface.

Optionally, the image acquisition component may be a camera. The camera may acquire the panorama scene screen and may acquire the first direction indicator. The graphical user interface may be generated based on the panorama scene screen and the first direction indicator. The graphical user interface may be displayed on the electronic device.

Optionally, the first direction indicator may be a topology arrow applied in the panorama display scene, and may be configured to indicate the forward direction in the panorama display scene. The forward direction is used for adjusting a position of a current horizontal perspective in the panorama display scene. The first area may be the visible area of the topology arrow in the graphical user interface, and the second area may be the invisible area of the topology arrow in the graphical user interface.

Optionally, an operation of acquiring the first area and the second area corresponding to the first direction indicator may includes the following step. The panorama display scene may be divided into the first area and the second area according to the current position of the topology arrow of the panorama display scene.

At step S22, an initial perspective range corresponding to the second area is acquired.

Optionally, the first direction indicator may be the topology arrow of the panorama display scene. The second area may be the invisible area of the topology arrow in the graphical user interface. The initial perspective range may be a perspective range corresponding to the invisible area in a horizontal direction.

At step S24, a target perspective range to which a first perspective belongs is determined from the initial perspective range, and a second direction indicator corresponding to the target perspective range is displayed. The first perspective is a current horizontal perspective monitored during rotation of a panorama.

Optionally, the first perspective is the current horizontal perspective monitored during rotation of the panorama. The target perspective range to which the first perspective belongs may be part of the initial perspective range and the target perspective range is determined according to the first perspective. The second direction indicator may be determined according to the target perspective range. The second direction indicator is configured to indicate a relative direction between a position of the first direction indicator and a position of the first perspective.

For example, a user may rotate the panorama by touching the graphical user interface to adjust the current perspective (equivalent to the first perspective), so as to observe the panorama display scene. When the user does not see the topology arrow (equivalent to the first direction indicator) in the current perspective, whether the current perspective is on a left side or a right side of the topology arrow is determined according to the position of the current perspective and the position of the topology arrow to obtain a determination result. An indicator (equivalent to the second direction indicator) that helps the user to find the topology arrow is displayed on the graphical user interface according to the determination result.

At step S26, the first perspective is adjusted to a second perspective based on the second direction indicator. The second perspective is an initial horizontal perspective of the first direction indicator displayed in the graphical user interface.

Optionally, the second direction indicator is configured to indicate the relative direction between the position of the first direction indicator and the position of the first perspective. The second perspective may be the initial horizontal perspective of the first direction indicator displayed in the graphical user interface. The first direction indicator may be adjusted to the second perspective according to the second direction indicator.

By means of the method provided in this embodiment, when the current perspective of the user is in the invisible area of the topology arrow, the indicator configured to indicate the position of the topology arrow may be displayed in the graphical user interface. The user may automatically find the topology arrow according to the indicator. That is, the perspective is automatically homed to the position corresponding to the topology arrow, to continuously use the topology arrow to adjust the position of the current perspective. Through the method provided in this embodiment, the problem that a method provided in the related art needs the user to blindly rotate the panorama to manually search the topology arrow is avoided.

According to S20 to S26 in the prevent disclosure, the first area and the second area corresponding to the first direction indicator are acquired. The first direction indicator is configured to indicate the forward direction in the panorama display scene. The first area is the visible area of the first direction indicator in the graphical user interface. The second area is the invisible area of the first direction indicator outside the graphical user interface. The initial perspective range corresponding to the second area is acquired. The target perspective range to which the first perspective belongs is determined from the initial perspective range, and the second direction indicator corresponding to the target perspective range is displayed. The first perspective is the current horizontal perspective monitored during rotation of the panorama. The first direction indicator is adjusted to the second perspective based on the second direction indicator. The second perspective is the target horizontal perspective of the first direction indicator. Therefore, the purpose of automatically homing the topology arrow according to a panorama direction indicator can be achieved, and the technical effect of improving user experience by enhancing homing efficiency of the panorama topology arrows can be realized, thereby solving the technical problem of low efficiency and poor user experience in a processing method of blindly rotating the perspective to manually search for topology arrows in the related art.

As an optional implementation, in step S20, an operation of acquiring the first area and the second area corresponding to the first direction indicator further includes the following method steps.

At step S201, a first width, a second width, the second perspective, and a third perspective are acquired. The first width is a width of the graphical user interface, the second width is a width of the first direction indicator, and the third perspective is a perspective corresponding to each pixel in the graphical user interface.

At step S202, the first area and the second area are determined according to the first width, the second width, the second perspective, and the third perspective.

Optionally, the graphical user interface at least displays the panorama scene screen and the first direction indicator.

The first direction indicator is configured to indicate the forward direction in the panorama display scene. In a process of acquiring the first width, the second width, the second perspective, and the third perspective, the width of the graphical user interface is determined as the first width, the width of the first direction indicator is determined as the second width, the initial horizontal perspective of the first direction indicator displayed in the graphical user interface is determined as the second perspective, and the perspective corresponding to each pixel in the graphical user interface is determined as the third perspective.

Optionally, the first area may be the visible area of the topology arrow in the graphical user interface, and the second area may be the invisible area of the topology arrow in the graphical user interface. The first area and the second area may be determined from the panorama display scene according to the first width, the second width, the second perspective, and the third perspective.

As an optional implementation, in step S202, an operation of determining the first area and the second area according to the first width, the second width, the second perspective, and the third perspective may further include the following method steps.

At step S2021, a fourth perspective and a fifth perspective are determined based on the first width, the second width, the second perspective, and the third perspective. The fourth perspective is a horizontal perspective corresponding to a boundary point of the first direction indicator that is not displayed in the graphical user interface during panoramic rotation in a first direction. The fifth perspective is a horizontal perspective corresponding to the boundary point of the first direction indicator that is not displayed in the graphical user interface during panoramic rotation in a second direction. The first direction is opposite to the second direction.

At step S2022, the first area and the second area are determined according to the fourth perspective and the fifth perspective.

Optionally, two opposite directions are preset as the first direction (for example, a counter-clockwise direction) and the second direction (for example, a clockwise direction). The fourth perspective may be the horizontal perspective corresponding to the boundary point of the first direction indicator that is not displayed in the graphical user interface during panoramic rotation in the first direction. The fifth perspective may be the horizontal perspective corresponding to the boundary point of the first direction indicator that is not displayed in the graphical user interface during panoramic rotation in the second direction.

Optionally, the first area may be the visible area of the topology arrow in the graphical user interface, and the second area may be the invisible area of the topology arrow in the graphical user interface. The fourth perspective and the fifth perspective may be determined based on the first width, the second width, the second perspective, and the third perspective. The first area and the second area may be determined according to the fourth perspective and the fifth perspective.

As an optional implementation, in step S201, an operation of acquiring the third perspective further includes the following method steps.

At step S2011, a field angle of the image acquisition component and a height of the graphical user interface are acquired.

At step S2012, the third perspective is calculated according to the field angle of the image acquisition component and the height of the graphical user interface.

Optionally, the third perspective may be the perspective corresponding to each pixel in the graphical user interface. The graphical user interface may be configured to display the panorama scene screen and the first direction indicator. The panorama scene screen is obtained by photographing the panorama display scene by means of the image acquisition component. The image acquisition component may be a camera. Therefore, the third perspective may be calculated according to the field angle of the image acquisition component and the height of the graphical user interface.

As an optional implementation, in step S22, an operation of acquiring the initial perspective range corresponding to the second area further includes the following method steps.

At step S221, the initial perspective range corresponding to the second area is determined according to the fourth perspective and the fifth perspective.

Optionally, the second area may be the invisible area of the topology arrow in the graphical user interface. The initial perspective range corresponding to the second area may be determined according to the fourth perspective and the fifth perspective. The initial perspective range may be a perspective range corresponding to the invisible area in a horizontal direction.

Figure 3:
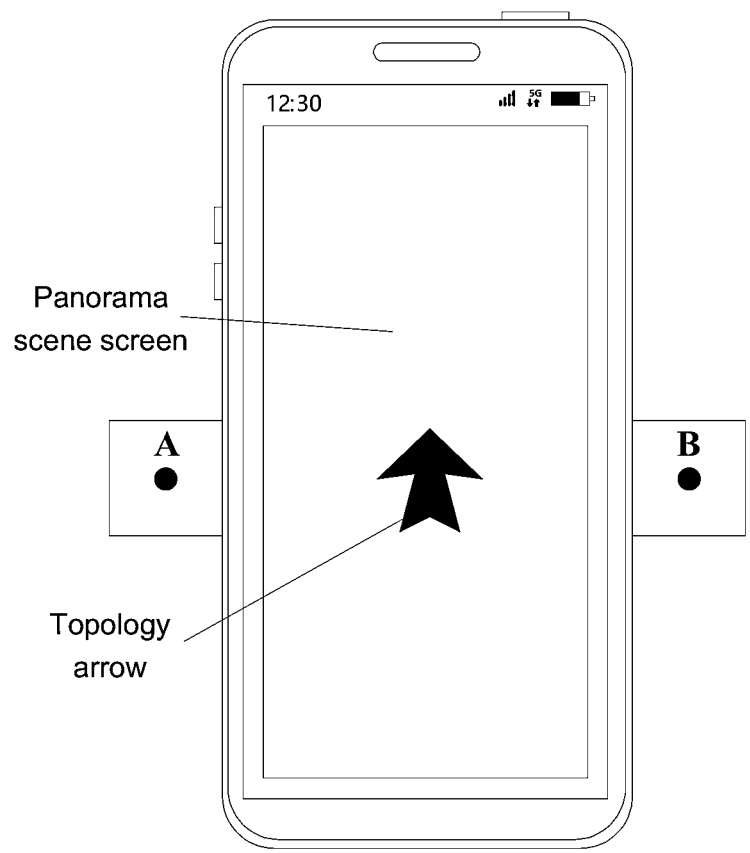
FIG. 3 is a schematic diagram of an optional graphical user interface according to an embodiment of the prevent disclosure.

FIG. 3 is a schematic diagram of an optional graphical user interface according to an embodiment of the prevent disclosure. As shown in FIG. 3, the graphical user interface may include the panorama scene screen and the panorama topology arrow. The user may rotate the panorama display scene screen through swiping a touch screen of a mobile terminal. Since the topology arrow is at a fixed position of the panorama, during the rotation of the panorama, the topology arrow may be moved out of a screen display area of the mobile terminal. In a panorama scene, an area that may display the panorama topology arrow in the screen of the mobile terminal is used as the visible area (equivalent to the first area), and an area that cannot display the panorama topology arrow in the screen of the mobile terminal is used as the invisible area (equivalent to the second area).

As shown in FIG. 3, during the rotation of the panorama, in response to the topology arrow being rotated to the left (equivalent to the first direction) to a rectangular area using an A point as a center point, and the topology arrow being continuously rotated to the left, the topology arrow is moved out of the screen display area. In this way, the A point may be used as a left boundary of the visible area of the topology arrow. Likewise, in response to the topology arrow being rotated to the right (equivalent to the second direction) to a rectangular position using a B point as a center point, and the topology arrow being continuously rotated to the right, the topology arrow is moved out of the screen display area. In this way, the B point may be used as a right boundary of the visible area of the topology arrow. Therefore, the visible area and the invisible area of the topology arrow in the panorama scene may be determined.

In addition, it is to be noted that, according to a mapping rule of a two-dimensional panorama, in response to the perspective being rotated in the counter-clockwise direction, an angle value corresponding to the horizontal perspective keeps decreasing. The angle value corresponding to the horizontal perspective ranges from 0 to 360 degrees.

Specifically, the method for determining the visible area and the invisible area includes the following steps.

At step one, the initialized topology arrow is at a center position of the screen of the mobile terminal. The following four parameters are acquired: a width screenW of the screen (equivalent to the first width), a width markW of the topology arrow (equivalent to the second width), an initial horizontal perspective heading (equivalent to the second perspective), and a perspective degree anglePerPixel (equivalent to the third perspective) corresponding to each screen pixel.

It is to be noted that, the perspective degree anglePerPixel (equivalent to the third perspective) corresponding to each screen pixel may be calculated according to the following formula (1).

$$anglePerPixel = fovy/screenH \quad \text{formula (1)}$$

In the formula (1), fovy represents a field angle of the camera of the mobile terminal, and screenH represents the height of the graphical user interface (which may also be the screen display area of the mobile terminal).

At step two, a horizontal perspective L (equivalent to the fourth perspective) corresponding to the A point at the left boundary of the visible area of the topology arrow is calculated according to the following formula (2). A horizontal perspective R corresponding to the B point at the right boundary of the visible area of the topology arrow is calculated according to the following formula (3).

$$L = heading - (screenW/2 - markW/2) \times anglePerPixel \quad \text{formula (2)}$$

$$R = heading + (screenW/2 + markW/2) \times anglePerPixel \quad \text{formula (3)}$$

Therefore, the visible area (equivalent to the first area) of the topology arrow may be determined as an area between the horizontal perspective L and the horizontal perspective R that includes the topology arrow. The invisible area (equivalent to the second area) of the topology arrow may be determined as an area between the horizontal perspective L and the horizontal perspective R that does not include the topology arrow. The perspective range between the horizontal perspective L and the horizontal perspective R that does not include the topology arrow may be determined as the initial perspective range corresponding to the invisible area.

As an optional implementation, in step S24, an operation of determining the target perspective range from the initial perspective range further includes the following method steps.

At step S241, a sixth perspective is calculated according to the fourth perspective and the fifth perspective. The sixth perspective is an intermediate perspective corresponding to the initial perspective range.

At step S242, the initial perspective range is divided into a first perspective range and a second perspective range based on the sixth perspective.

At step S243, the target perspective range to which the first perspective belongs is determined from the first perspective range and the second perspective range.

Optionally, the sixth perspective may be an intermediate perspective corresponding to the initial perspective range. The initial perspective range may be a perspective range corresponding to the invisible area in a horizontal direction. The sixth perspective may be calculated based on the fourth perspective and the fifth perspective.

Optionally, the first perspective range may be part of the perspective range corresponding to the invisible area on the left side. The second perspective range may be part of the perspective range corresponding to the invisible area on the right side. The initial perspective range may be divided into the first perspective range and the second perspective range based on the sixth perspective.

It is to be noted that, the first perspective range may also be part of the perspective range corresponding to the invisible area on the right side. The second perspective range may also be part of the perspective range corresponding to the invisible area on the left side.

Optionally, in a process of determining the target perspective range to which the first perspective belongs from the first perspective range and the second perspective range, the current horizontal perspective during rotation of the panorama is determined as the first perspective, whether the first perspective belongs to the first perspective range and the second perspective range is determined according to a position relationship between the first perspective and the sixth perspective, and the perspective range to which the first perspective belongs is determined as the target perspective range.

Figure 4:
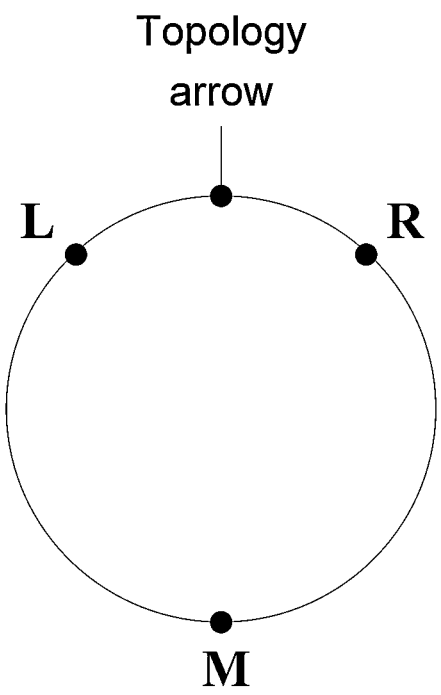
FIG. 4 is a schematic diagram of area division of an optional panorama scene according to an embodiment of the prevent disclosure.

FIG. 4 is a schematic diagram of area division of an optional panorama scene according to an embodiment of the prevent disclosure. As shown in FIG. 4, the initialized topology arrow is at the center position of the graphical user interface. The position of the topology arrow at one of the middle positions of the horizontal perspective L (equivalent to the fourth perspective) corresponding to the A point at the left boundary of the visible area of the topology arrow and the horizontal perspective R (equivalent to the fifth perspective) corresponding to the B point at the right boundary. In this case, the other middle position of the horizontal perspective L and the horizontal perspective R is determined as a middle angle M (equivalent to the sixth perspective) of the invisible area of the topology arrow.

A method for determining the angle value of the middle angle M by normalizing an angle includes the following operations.

First, the following formula (4) is determined as a method function Fn for normalizing the angle to [0, 360).

$$Fn = degree - Math.floor(degree/360) \times 360 \qquad \text{formula (4)}$$

In the formula (4), degree represents an angle argument, and Math. floor represents a function that rounds down a floating point number.

Next, the angle value of the horizontal perspective L is compared with the angle value of the horizontal perspective R to obtain a comparison result, and the angle value of the middle angle M is determined according to the comparison result.

If L>R, a 0-degree (360-degree) position is in the visible area, M=Fn[(L+R)/2].

If L<R, the 0-degree (360-degree) position is in the invisible area, M=Fn[(L+R)/2+180].

According to the horizontal perspectives L, R, and M, an invisible horizontal perspective interval (equivalent to the first perspective range) on the left side of the topology arrow may be determined as [M, L], and an invisible horizontal perspective interval (equivalent to the second perspective range) on the right side of the topology arrow may be determined as [R, M].

For example, in a panorama scene, a horizontal perspective degree corresponding to a position of a topology arrow is 100 degrees. The degree of the horizontal perspective L corresponding to the left boundary A of the visible area is calculated as 70 degrees, and the degree of the horizontal perspective R corresponding to the right boundary B is calculated as 130 degrees. In this case, L<R. The degree of the middle angle M of the invisible area is calculated as 280 degrees. In this case, the invisible horizontal perspective interval on the left side is [280, 70], and the invisible horizontal perspective interval on the right side is [130, 280]. The current horizontal perspective after the user Y rotates the panorama is monitored as 300 degrees, so that, it is easy to determine that the invisible horizontal perspective interval on the left side of which the current horizontal perspective belongs is [280, 70]. In this case, the invisible horizontal perspective interval on the left side is used as the target perspective range.

In particular, for an interval [left, right], it is assumed that the current perspective is represented as cur, a left side value of the interval is represented as left, and a right side value of the interval is represented as right, whether the current perspective is in the interval may be determined according to an isInRange method as follows.

(1) left>right, the interval includes 0 degree (360 degrees), and if cur>left or cur<right, the current perspective cur is in the interval.

(2) left<right, the interval does not include 0 degree (360 degrees), and if cur>left or cur<right, the current perspective cur is in the interval.

The isInRange method may be expressed as: an isInRange (L, M, cur) returned value is true, and the current perspective cur is in the interval [L, M].

As an optional implementation, in step S24, an operation of displaying the second direction indicator corresponding to the target perspective range further includes the following method steps.

At step S244, in response to determining that the first perspective belongs to the first perspective range, the second direction indicator corresponding to the first perspective range is displayed. The second direction indicator is configured to indicate a third direction corresponding to the first perspective range.

At step S245, in response to determining that the first perspective belongs to the second perspective range, the second direction indicator corresponding to the second perspective range is displayed. The second direction indicator is configured to indicate a fourth direction corresponding to the second perspective range. The third direction is opposite to the fourth direction.

Optionally, the first perspective range may be part of the perspective range corresponding to the invisible area on the left side. The third direction corresponding to the first perspective range may be left. The second perspective range may be part of the perspective range corresponding to the invisible area on the right side. The fourth direction corresponding to the second perspective range may be right. That is, the third direction is opposite to the fourth direction.

It is to be noted that, the first perspective range may also be part of the perspective range corresponding to the invisible area on the right side. The third direction corresponding to the first perspective range may be right. The second perspective range may also be part of the perspective range corresponding to the invisible area on the left side. The fourth direction corresponding to the second perspective range may be left.

Optionally, the second direction indicator may be configured to indicate a direction corresponding to the target perspective range of which the first perspective belongs. In response to the first perspective belonging to the first perspective range, the second direction indicator displayed in the graphical user interface is configured to indicate the third direction corresponding to the first perspective range. In response to the first perspective belonging to the second perspective range, the second direction indicator displayed in the graphical user interface is configured to indicate the fourth direction corresponding to the second perspective range.

Figure 5:
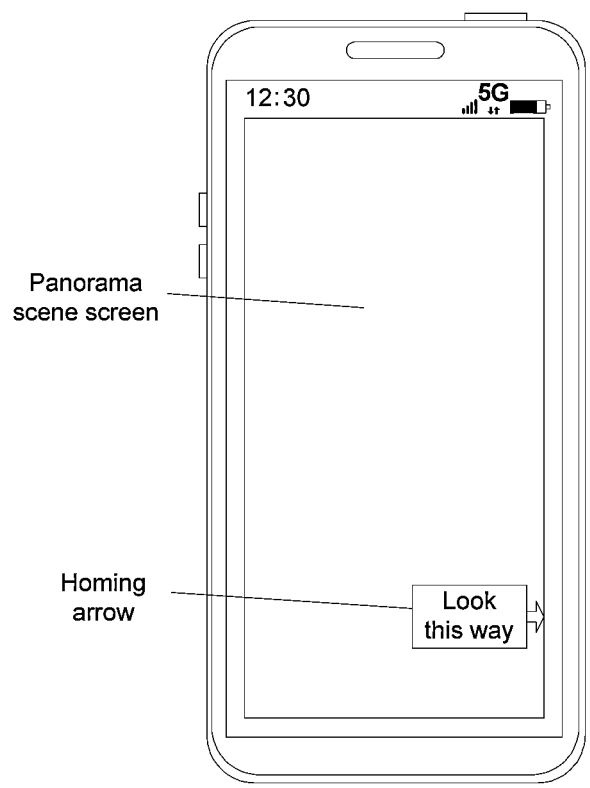
FIG. 5 is a schematic diagram of another optional graphical user interface according to an embodiment of the prevent disclosure.

FIG. 5 is a schematic diagram of another optional graphical user interface according to an embodiment of the prevent disclosure. As shown in FIG. 5, in the panorama scene, the user rotates the panorama to the current perspective cur1. According to the isInRange method, IsInRange (L, M, cur1) returns to true, which indicates that the topology arrow is rotated in the left invisible area (equivalent to the first perspective range). In this case, a leftward homing arrow (equivalent to the second direction indicator) is displayed on the graphical user interface.

Figure 6:
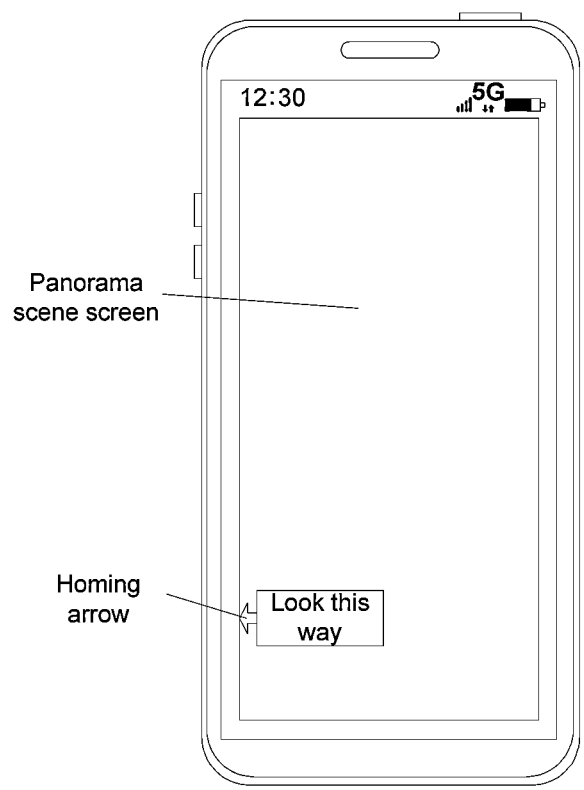
FIG. 6 is a schematic diagram of another optional graphical user interface according to an embodiment of the prevent disclosure.

FIG. 6 is a schematic diagram of another optional graphical user interface according to an embodiment of the prevent disclosure. As shown in FIG. 6, in the panorama scene, the user rotates the panorama to the current perspective cur2. According to the isInRange method, IsInRange (M, R, cur2) returns to true, which indicates that the topology arrow is rotated in the right invisible area (equivalent to the second perspective range). In this case, a rightward homing arrow (equivalent to the second direction indicator) is displayed on the graphical user interface.

By means of the method provided in this embodiment, in the panorama scene, when the user rotates the topology arrow outside a display area of the mobile terminal, a responsive homing arrow (equivalent to the second direction indicator) is displayed on the graphical user interface. Therefore, the user may automatically adjust the current perspective to the initial perspective (equivalent to the second perspective) of the initialized topology arrow by clicking the homing arrow. In the initial perspective, the topology arrow is displayed in a center position of the graphical user interface.

By means of the method provided in this embodiment, the purpose of automatically homing the topology arrow according to the panorama direction indicator can be achieved, and the technical effect of improving user experience by enhancing homing efficiency of the panorama topology arrows can be realized, thereby solving the technical problem of low efficiency and poor user experience in a processing method of blindly rotating the perspective to manually search for topology arrows in the related art.

From the above descriptions about the implementation modes, those skilled in the art may clearly know that the method according to the foregoing embodiments may be implemented in a manner of combining software and a necessary universal hardware platform, and of course, may also be implemented through hardware, but the former is an optional implementation mode under many circumstances. Based on such an understanding, the technical solutions of the prevent disclosure substantially or parts making contributions to the conventional art may be embodied in form of a software product, and the computer software product is stored in a storage medium, including multiple instructions for causing a terminal device (which may be a mobile phone, a computer, a server, a network device or the like) to execute the method in each embodiment of the prevent disclosure.

The prevent disclosure further provides an apparatus for adjusting a perspective of a direction indicator. The apparatus is configured to implement the foregoing embodiments and the exemplary implementation, and what has been described will not be described again. As used below, the term "module" may be a combination of software and/or hardware that implements a predetermined function. Although the apparatus described in the following embodiments is exemplary implemented in software, but implementations in hardware, or a combination of software and hardware, are also possible and conceived.

Figure 7:
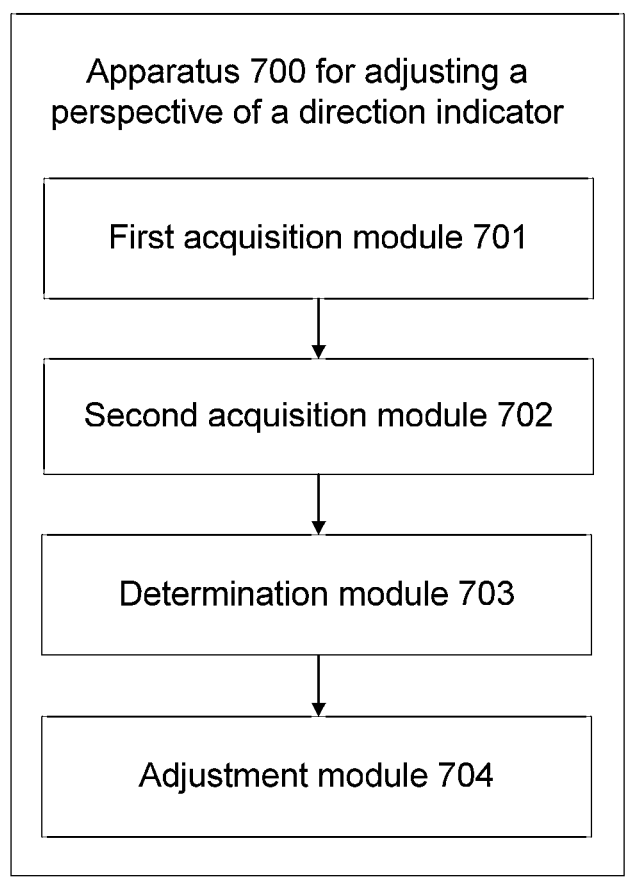
FIG. 7 is a structural block diagram of an apparatus for adjusting a perspective of a direction indicator according to an embodiment of the prevent disclosure.
Figure 3:
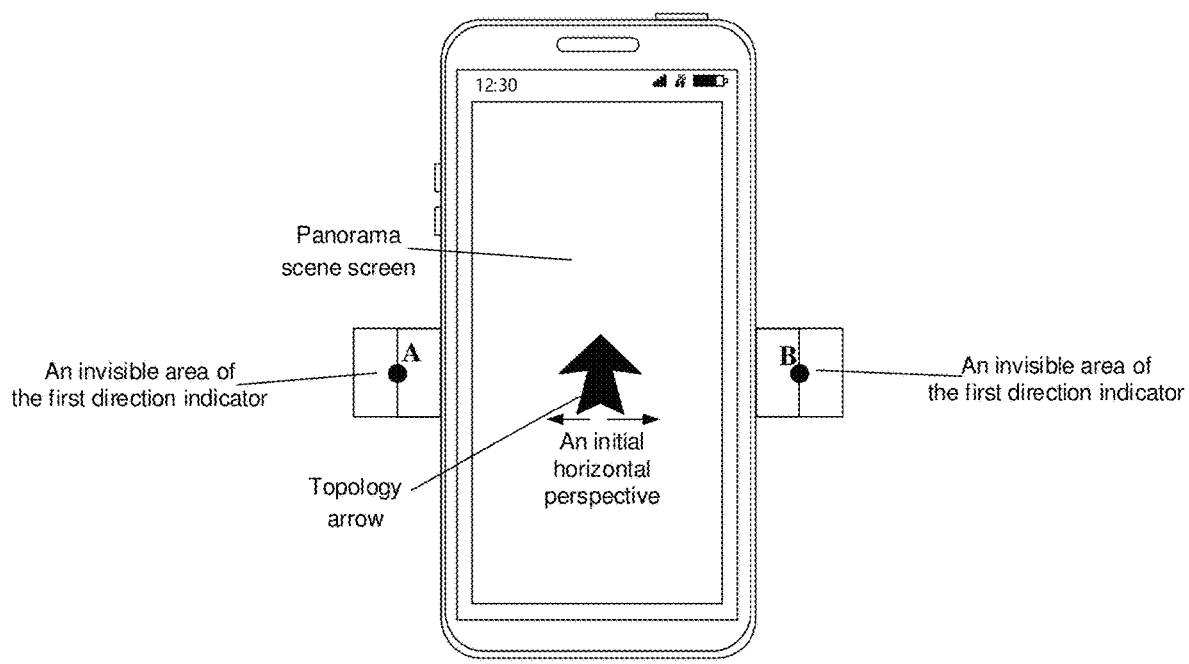
Figure 4:
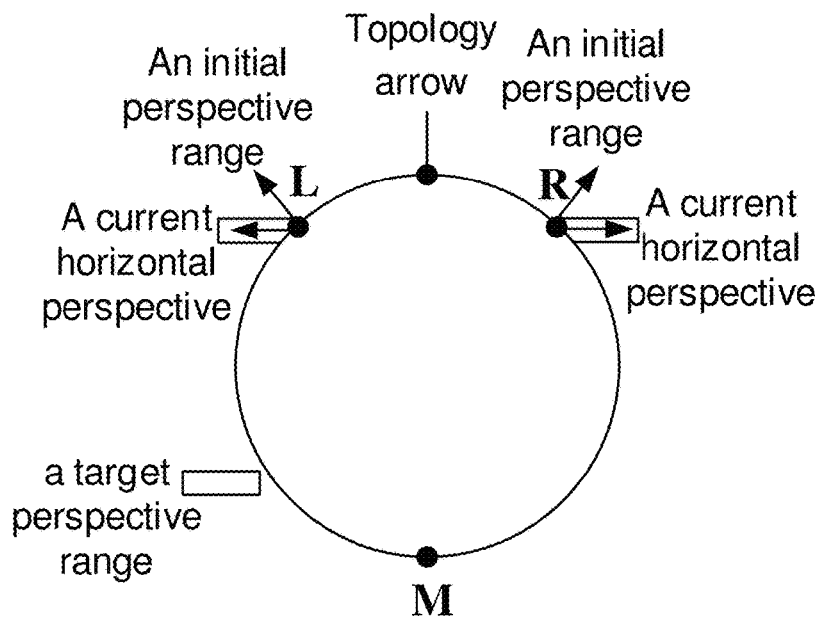

FIG. 7 is a structural block diagram of an apparatus for adjusting a perspective of a direction indicator according to an embodiment of the prevent disclosure. As shown in FIG. 7, a graphical user interface is provided by the electronic device. Contents displayed in the graphical user interface at least partially include a panorama scene screen obtained by photographing a panorama display scene by means of an image acquisition component and a first direction indicator. The apparatus 700 for adjusting the perspective of the direction indicator includes a first acquisition module 701, a second acquisition module 702, a determination module 703, and an adjustment module 704.

The first acquisition module 701 is configured to acquire a first area and a second area corresponding to the first direction indicator. The first direction indicator is configured to indicate a forward direction in the panorama display scene, the first area is a visible area of the first direction indicator in the graphical user interface, and the second area is an invisible area of the first direction indicator outside the graphical user interface. The second acquisition module 702 is configured to acquire an initial perspective range corresponding to the second area. The determination module 703 is configured to determine a target perspective range to which a first perspective belongs from the initial perspective range, and display a second direction indicator corresponding to the target perspective range. The first perspective is a current horizontal perspective monitored during rotation of a panorama. The adjustment module 704 is configured to adjust the first perspective to a second perspective based on the second direction indicator. The second perspective is an initial horizontal perspective of the first direction indicator displayed in the graphical user interface.

Optionally, the first acquisition module 701 is further configured to: acquire a first width, a second width, the second perspective, and a third perspective, where the first width is a width of the graphical user interface, the second width is a width of the first direction indicator, and the third perspective is a perspective corresponding to each pixel in the graphical user interface; and determine the first area and the second area according to the first width, the second width, the second perspective, and the third perspective.

Optionally, the first acquisition module 701 is further configured to: determine a fourth perspective and a fifth perspective based on the first width, the second width, the second perspective, and the third perspective, where the fourth perspective is a horizontal perspective corresponding to a boundary point of the first direction indicator that is not displayed in the graphical user interface during panoramic rotation in a first direction, the fifth perspective is a horizontal perspective corresponding to the boundary point of the first direction indicator that is not displayed in the graphical user interface during panoramic rotation in a second direction, and the first direction is opposite to the second direction; and determine the first area and the second area according to the fourth perspective and the fifth perspective.

Optionally, the first acquisition module 701 is further configured to: acquire a field angle of the image acquisition component and a height of the graphical user interface; and calculate the third perspective according to the field angle of the image acquisition component and the height of the graphical user interface.

Optionally, the second acquisition module 702 is further configured to: determine the initial perspective range corresponding to the second area according to the fourth perspective and the fifth perspective.

Optionally, the determination module 703 is further configured to: calculate a sixth perspective according to the fourth perspective and the fifth perspective, where the sixth perspective is an intermediate perspective corresponding to the initial perspective range; divide the initial perspective range into a first perspective range and a second perspective range based on the sixth perspective; and determine the target perspective range to which the first perspective belongs from the first perspective range and the second perspective range.

Optionally, the determination module 703 is further configured to: in response to determining that the first perspective belongs to the first perspective range, display the second direction indicator corresponding to the first perspective range, where the second direction indicator is configured to indicate a third direction corresponding to the first perspective range; and in response to determining that the first perspective belongs to the second perspective range, display the second direction indicator corresponding to the second perspective range. The second direction indicator is configured to indicate a fourth direction corresponding to the second perspective range. The third direction is opposite to the fourth direction.

It is to be noted that, each of the above modules may be implemented by software or hardware. For the latter, it may be implemented in the following manners, but is not limited to the follow: the above modules are all located in a same processor; or the above modules are located in different processors in any combination.

According to an embodiment of the prevent disclosure, the prevent disclosure further provides an electronic device. The electronic device includes a memory and at least one processor. The memory is configured to store at least one computer instruction. The processor is configured to operation the at least one computer instruction to perform steps in any of the above method embodiments.

Optionally, the electronic device may further include a transmission device and an input/output device. The transmission device is connected with the processor. The input/output device is connected with the processor.

Optionally, in this embodiment, the processor may be configured to perform the following steps through the computer program.

At step S1, a first area and a second area corresponding to a first direction indicator are acquired. The first direction indicator is configured to indicate a forward direction in a panorama display scene. The first area is a visible area of the first direction indicator in a graphical user interface, and the second area is an invisible area of the first direction indicator outside the graphical user interface.

At step S2, an initial perspective range corresponding to the second area is acquired.

At step S3, a target perspective range to which a first perspective belongs is determined from the initial perspective range, and a second direction indicator corresponding to the target perspective range is displayed. The first perspective is a current horizontal perspective monitored during rotation of a panorama.

At step S4, the first perspective is adjusted to a second perspective based on the second direction indicator. The second perspective is an initial horizontal perspective of the first direction indicator displayed in the graphical user interface.

Optionally, for specific examples in this embodiment, refer to the examples described in the foregoing embodiments and the optional implementations, and this embodiment will not be repeated thereto.

According to an embodiment of the prevent disclosure, the prevent disclosure further provides a non-transitory computer-readable storage medium storing at least one computer instruction. The non-transitory computer-readable storage medium is configured to store at least one computer instruction. Steps in any of the above method embodiments are performed when the computer instruction is operated.

Optionally, in this embodiment, the non-transitory computer-readable storage medium may be configured to store a computer program for performing the following steps.

At step S1, a first area and a second area corresponding to a first direction indicator are acquired. The first direction indicator is configured to indicate a forward direction in a panorama display scene. The first area is a visible area of the first direction indicator in a graphical user interface, and the second area is an invisible area of the first direction indicator outside the graphical user interface.

At step S2, an initial perspective range corresponding to the second area is acquired.

At step S3, a target perspective range to which a first perspective belongs is determined from the initial perspective range, and a second direction indicator corresponding to the target perspective range is displayed. The first perspective is a current horizontal perspective monitored during rotation of a panorama.

At step S4, the first perspective is adjusted to a second perspective based on the second direction indicator. The second perspective is an initial horizontal perspective of the first direction indicator displayed in the graphical user interface.

Optionally, in this embodiment, the non-transitory computer-readable storage medium may include, but is not limited to, a USB flash disk, a Read-Only Memory (ROM), a Random Access Memory (RAM), and various media that can store computer programs, such as a mobile hard disk, a magnetic disk, or an optical disk.

According to an embodiment of the prevent disclosure, the prevent disclosure further provides a computer program product. Program codes used for implementing the method for adjusting a perspective of a direction indicator of the prevent disclosure can be written in any combination of at least one programming languages. These program codes can be provided to the processors or controllers of general computers, special computers, or other programmable data processing devices, so that, when the program codes are performed by the processors or controllers, functions/operations specified in the flowcharts and/or block diagrams are implemented. The program codes can be performed entirely on a machine, partially performed on the machine, and partially performed on the machine and partially performed on a remote machine as an independent software package, or entirely performed on the remote machine or a server.

The serial numbers of the foregoing embodiments of the prevent disclosure are for description, and do not represent the superiority or inferiority of the embodiments.

In the above embodiments of the prevent disclosure, the description of the embodiments has its own focus. For parts that are not described in detail in a certain embodiment, reference may be made to related descriptions of other embodiments.

In the several embodiments provided in the prevent disclosure, it should be understood that, the disclosed technical content can be implemented in other ways. The apparatus embodiments described above are illustrative. For example, the division of the units may be a logical function division, and there may be other divisions in actual implementation. For example, multiple units or components may be combined or integrated into another system, or some features can be ignored, or not implemented. In addition, the displayed or discussed mutual coupling or direct coupling or communication connection may be indirect coupling or communication connection through some interfaces, units or modules, and may be in electrical or other forms.

The units described as separate components may or may not be physically separated. The components displayed as units may or may not be physical units, that is, the components may be located in one place, or may be distributed on the multiple units. Part or all of the units may be selected according to actual requirements to achieve the purposes of the solutions of this embodiment.

In addition, the functional units in the various embodiments of the prevent disclosure may be integrated into one processing unit, or each unit may exist alone physically, or at least two units may be integrated into one unit. The above integrated unit can be implemented in the form of hardware, or can be implemented in the form of a software functional unit.

If the integrated unit is implemented in the form of the software functional unit and sold or used as an independent product, it can be stored in the computer readable storage medium. Based on this understanding, the technical solutions of the prevent disclosure essentially or the parts that contribute to the related art, or all or part of the technical solutions can be embodied in the form of a software product. The computer software product is stored in a storage medium, including multiple instructions for causing a computer device (which may be a personal computer, a server, or a network device, and the like) to execute all or part of the steps of the method described in the various embodiments of the prevent disclosure. The foregoing storage medium includes a USB flash disk, a Read-Only Memory (ROM), a Random Access Memory (RAM), and various media that can store program codes, such as a mobile hard disk, a magnetic disk, or an optical disk.

The above description are exemplary implementations of the prevent disclosure, and it should be noted that persons of ordinary skill in the art may also make several improvements and refinements without departing from the principle of the prevent disclosure, and it should be considered that these improvements and refinements shall all fall within the protection scope of the prevent disclosure.

The invention claimed is:

1. A method for adjusting a perspective of a direction indicator, a graphical user interface being provided by an electronic device, contents displayed in the graphical user interface at least partially comprising a panorama scene screen obtained by photographing a panorama display scene and a first direction indicator, the method comprising:

acquiring a first area and a second area corresponding to the first direction indicator, wherein the first direction indicator is a topology arrow applied in the panorama display scene, and the first direction indicator is configured to indicate a forward direction in the panorama display scene, the first area is a visible area of the first direction indicator in the graphical user interface, and the second area is an invisible area of the first direction indicator outside the graphical user interface;

acquiring an initial perspective range corresponding to the second area, wherein the initial perspective range is used for representing a range outside a boundary of the visible area of the topology arrow;

determining a target perspective range to which a first perspective belongs from the initial perspective range, and displaying a second direction indicator corresponding to the target perspective range, wherein the first perspective is a current horizontal perspective monitored during rotation of a panorama, wherein the current horizontal perspective comprises a horizontal perspective corresponding to the boundary; and adjusting the first perspective to a second perspective based on the second direction indicator, wherein the second perspective is an initial horizontal perspective of the first direction indicator displayed in the graphical user interface;

wherein determining the target perspective range from the initial perspective range comprises: calculating a sixth perspective according to a fourth perspective and a fifth perspective, wherein the fourth perspective is a horizontal perspective corresponding to a boundary point of the first direction indicator, the first direction indicator is not displayed in the graphical user interface during panoramic rotation in a first direction, the fifth perspective is the horizontal perspective corresponding to the boundary point of the first direction indicator that is not displayed in the graphical user interface during panoramic rotation in a second direction, the first direction is opposite to the second direction, and the sixth perspective is an intermediate perspective corresponding to the initial perspective range; dividing the initial perspective range into a first perspective range and a second perspective range, based on the sixth perspective; and determining the target perspective range to which the first perspective belongs from the first perspective range and the second perspective range.

2. The method as claimed in claim 1, wherein acquiring the first area and the second area corresponding to the first direction indicator comprises:

acquiring a first width, a second width, the second perspective, and a third perspective, wherein the first width is a width of the graphical user interface, the second width is a width of the first direction indicator, and the third perspective is a perspective corresponding to each pixel in the graphical user interface; and determining the first area and the second area according to the first width, the second width, the second perspective, and the third perspective.

3. The method as claimed in claim 2, wherein acquiring the third perspective comprises:

acquiring a field angle of an image acquisition component and a height of the graphical user interface; and calculating the third perspective according to the field angle of the image acquisition component and the height of the graphical user interface.

4. The method as claimed in claim 2, wherein determining the first area and the second area according to the first width, the second width, the second perspective, and the third perspective comprises:

determining the fourth perspective and the fifth perspective based on the first width, the second width, the second perspective, and the third perspective; and determining the first area and the second area according to the fourth perspective and the fifth perspective.

5. The method as claimed in claim 4, wherein the first direction is a counter-clockwise direction and the second direction is a clockwise direction.

6. The method as claimed in claim 4, wherein acquiring the initial perspective range corresponding to the second area comprises:

determining the initial perspective range corresponding to the second area according to the fourth perspective and the fifth perspective.

7. The method as claimed in claim 1, wherein the forward direction is used for adjusting a position of the current horizontal perspective in the panorama display scene.

8. The method as claimed in claim 1,
wherein displaying the second direction indicator corresponding to the target perspective range comprises:
in response to determining that the first perspective belongs to the first perspective range, displaying the second direction indicator corresponding to the first perspective range, wherein the second direction indicator is configured to indicate a third direction corresponding to the first perspective range; and
in response to determining that the first perspective belongs to the second perspective range, displaying the second direction indicator corresponding to the second perspective range, wherein the second direction indicator is configured to indicate a fourth direction corresponding to the second perspective range;
wherein the third direction is opposite to the fourth direction.

9. The method as claimed in claim 1, wherein the first direction indicator is a topology arrow applied in the panorama display scene.

10. The method as claimed in claim 9, wherein the first area is a visible area of the topology arrow in the graphical user interface.

11. The method as claimed in claim 9, wherein the second area is the invisible area of the topology arrow in the graphical user interface.

12. The method as claimed in claim 9, wherein the method further comprises:
dividing the panorama display scene into the first area and the second area according to the current position of the topology arrow of the panorama display scene.

13. The method as claimed in claim 9, wherein the topology arrow is at a fixed position of the panorama.

14. The method as claimed in claim 9, wherein the topology arrow is displayed in a center position of the graphical user interface.

15. The method as claimed in claim 1, wherein the initial perspective range is a perspective range corresponding to the invisible area in a horizontal direction.

16. The method as claimed in claim 1, wherein the target perspective range to which the first perspective belongs is part of the initial perspective range.

17. The method as claimed in claim 1, wherein the second direction indicator is configured to indicate a relative direction between a position of the first direction indicator and a position of the first perspective.

18. An electronic device, comprising:
at least one processor, and
a memory, communicatively connected with the at least one processor, wherein
the memory is configured to store at least one instruction executable by the at least one processor, and the at least one instruction is performed by the at least one processor, to cause the at least one processor to perform the following steps:
providing a graphical user interface by an electronic device, contents displayed in the graphical user interface at least partially comprising a panorama scene screen obtained by photographing a panorama display scene and a first direction indicator;
acquiring a first area and a second area corresponding to the first direction indicator, wherein the first direction indicator is a topology arrow applied in the panorama display scene, and the first direction indicator is configured to indicate a forward direction in the panorama display scene, the first area is a visible area of the first direction indicator in the graphical user interface, and the second area is an invisible area of the first direction indicator outside the graphical user interface;
acquiring an initial perspective range corresponding to the second area, wherein the initial perspective range is used for representing a range outside a boundary of the visible area of the topology arrow;
determining a target perspective range to which a first perspective belongs from the initial perspective range, and displaying a second direction indicator corresponding to the target perspective range, wherein the first perspective is a current horizontal perspective monitored during rotation of a panorama, wherein the current horizontal perspective comprises a horizontal perspective corresponding to the boundary; and
adjusting the first perspective to a second perspective based on the second direction indicator, wherein the second perspective is an initial horizontal perspective of the first direction indicator displayed in the graphical user interface;
wherein determining the target perspective range from the initial perspective range comprises: calculating a sixth perspective according to a fourth perspective and a fifth perspective, wherein the fourth perspective is a horizontal perspective corresponding to a boundary point of the first direction indicator, the first direction indicator is not displayed in the graphical user interface during panoramic rotation in a first direction, the fifth perspective is the horizontal perspective corresponding to the boundary point of the first direction indicator that is not displayed in the graphical user interface during panoramic rotation in a second direction, the first direction is opposite to the second direction, and the sixth perspective is an intermediate perspective corresponding to the initial perspective range; dividing the initial perspective range into a first perspective range and a second perspective range, based on the sixth perspective; and determining the target perspective range to which the first perspective belongs from the first perspective range and the second perspective range.

19. A non-transitory computer-readable storage medium, storing at least one computer instruction, wherein the at least one computer instruction is used for a computer to perform the following steps:
providing a graphical user interface by an electronic device, contents displayed in the graphical user interface at least partially comprising a panorama scene screen obtained by photographing a panorama display scene and a first direction indicator;
acquiring a first area and a second area corresponding to the first direction indicator, wherein the first direction indicator is a topology arrow applied in the panorama display scene, and the first direction indicator is configured to indicate a forward direction in the panorama display scene, the first area is a visible area of the first direction indicator in the graphical user interface, and the second area is an invisible area of the first direction indicator outside the graphical user interface;
acquiring an initial perspective range corresponding to the second area, wherein the initial perspective range is used for representing a range outside a boundary of the visible area of the topology arrow;
determining a target perspective range to which a first perspective belongs from the initial perspective range, and displaying a second direction indicator corresponding to the target perspective range, wherein the first perspective is a current horizontal perspective monitored during rotation of a panorama, wherein the current horizontal perspective comprises the horizontal perspective corresponding to the boundary; and adjusting the first perspective to a second perspective based on the second direction indicator, wherein the second perspective is an initial horizontal perspective of the first direction indicator displayed in the graphical user interface;

wherein determining the target perspective range from the initial perspective range comprises: calculating a sixth perspective according to a fourth perspective and a fifth perspective, wherein the fourth perspective is a horizontal perspective corresponding to a boundary point of the first direction indicator, the first direction indicator is not displayed in the graphical user interface during panoramic rotation in a first direction, the fifth perspective is the horizontal perspective corresponding to the boundary point of the first direction indicator that is not displayed in the graphical user interface during panoramic rotation in a second direction, the first direction is opposite to the second direction, and the sixth perspective is an intermediate perspective corresponding to the initial perspective range; dividing the initial perspective range into a first perspective range and a second perspective range, based on the sixth perspective; and determining the target perspective range to which the first perspective belongs from the first perspective range and the second perspective range.

* * * * *